US005313250A

United States Patent [19]

Miura et al.

[11] Patent Number: 5,313,250

[45] Date of Patent: May 17, 1994

[54] MOVEMENT CONTROLLING DEVICE

[75] Inventors: Masaaki Miura, Sakado; Minoru Suzuki, Omiya, both of Japan

[73] Assignee: Asahi Kogaku Kogyo Kabushiki Kaisha, Tokyo, Japan

[21] Appl. No.: 896,890

[22] Filed: Jun. 10, 1992

Related U.S. Application Data

[63] Continuation of Ser. No. 687,095, Apr. 19, 1991, abandoned, which is a continuation of Ser. No. 386,230, Jul. 28, 1989, abandoned.

[30] Foreign Application Priority Data

Aug. 1, 1988 [JP] Japan ............................... 63-192220

[51] Int. Cl.[5] ............................................ G03B 27/34

[52] U.S. Cl. ....................................... 355/57; 355/58; 355/243

[58] Field of Search ..................... 355/55, 57, 58, 233, 355/234, 235, 243

[56] References Cited

U.S. PATENT DOCUMENTS

| | | | |
|---|---|---|---|
| 4,322,159 | 3/1982 | Takahashi et al. | 355/57 |
| 4,420,248 | 12/1983 | Ogawa et al. | 355/57 |
| 4,557,594 | 12/1985 | Negoro | 355/58 |
| 4,571,064 | 2/1986 | Hayashi et al. | 355/57 X |
| 4,800,414 | 1/1989 | Takeda | 355/57 |

*Primary Examiner*—Michael L. Gellner
*Assistant Examiner*—Khanh Dang
*Attorney, Agent, or Firm*—Sandler, Greenblum & Bernstein

[57] ABSTRACT

A variable power optical system having a mechanical system capable of moving a lens holder and a mirror holder having a predetermined relationship. A driving force moves the lens holder and the mirror holder. The movement of the mirror holder is controlled so as to control the magnification power of the optical system. The present optical system permits a widened power range to be employed without making the total capacity of a machine large.

42 Claims, 10 Drawing Sheets

MOVEMENT CONTROLLING DEVICE

This application is a continuation of application Ser. No. 07/386,230, filed Jul 28, 1989, now abandoned.

BACKGROUND OF THE INVENTION

The present invention relates to a movement controlling device for use, for example, as a variable power optical system used in a copying machine designed to make a magnifying power variable by moving a fixed focus lens, and more particularly to an improved mechanism for driving mirrors placed in between a lens and a projection image plane, for example a circumferential surface of a photoconductive drum, to move synchronously with the movement of the lens.

In a so-called electronic copying machine designed to take copies by an electrophotographic duplicating process, an original mounted on an original tray is illuminated with light emitted from a light source, such as a fluorescent lamp, and an image thus exposed to the light from the light source is formed on an electrophotographic photoconductive drum via an image forming system comprising a lens and mirrors.

A recently developed variable power optical systems is such that the magnifying power of a projected image is varied by varying the distance between the original plane and the lens, and the distance between the lens and the projection image plane (i.e., the surface of the photoconductive drum) by moving the lens as part of the image-forming system in the direction of the optical axis. The aforementioned optical system has a so-called variable power function for taking copies of the original, ranging from original size copies to enlarged or reduced size copies.

In such a conventional variable power optical system employing a fixed focus lens (having a fixed focal length), as shown in FIG. 1, there is provided a mirror unit "C", wherein two mirrors are disposed opposite to each other at right angles between a lens "A" and a photoconductive drum "B". The mirror unit "C" is used to invert an optical path and simultaneously move correspondingly to variations of the distance between the original plane and the lens "A" resulting from the movement of the lens A (direction "X" in FIG. 1) so that an optical image corresponding to an image on the original is formed on the circumferential surface of the photoconductive drum "B".

The lens "A" and the mirror unit "C" are disposed as shown in FIG. 2 and moved.

More specifically, a lens holding member 1A holds lens 1 and is slidable fitted into a guide member 11 provided on a chassis of a machine, whereas a mirror holding member 2 for holding mirrors is slidably fitted into a guide member 13 provided thereon likewise. In the lend holding member 1A, an endless wire 6 is wound on pulleys 12, 12 as well as on pulley 3 which is driven by a motor (not shown) and the lens holding member 1A is driven to move by the endless wire as the motor rotates.

The mirror holding member 2 has to be moved in a predetermined relationship with the movement of the lens 1. The mirror holding member 2 is moved by causing a cam follower 25 provided on the mirror holding member 2 to follow a cam 4 which is driven to synchronously rotate with the rotation of pulley 3 for driving the lens that holds member 1A holding the lens 1.

Although almost no problem occurs as long as the magnifying power of the projected image is within a narrow range of 1.4–0.6 times, the movement of the mirrors naturally tends to become greater when the variable range of the magnifying power is widened up to 2.05–0.48 times. With the aforementioned conventional arrangement, the displacement of the cam thus increased allows the cam follower not to follow the cam; the problem is that the mirrors will become unmovable.

In order to solve the above problems, there has been proposed an arrangement wherein the lens and the mirrors are driven by different motors respectively synchronously with each other. However, an increase in production cost becomes unavoidable in this case.

SUMMARY OF THE INVENTION

It is therefore an object of the present invention to provide an improved movement controlling device for use, for example, in a copying machine, which ensures the accurate movement of mirrors, even when the variable power range is widened; that is, the movement of the mirrors can be made large without increase of product cost.

According to present invention, there is provided a movement controlling device for controlling a movement of a first moving member that is movable along a predetermined direction and a movement of a second moving member that is movable along another predetermined direction, the movement controlling device comprises:

means for driving the first moving member so as to move along the predetermined direction;

a cam member that is rotatable in response to a driving operation executed by the drive means for driving the second moving member so as to move in accordance with a first function based upon a cam profile thereof, whereby a positional relationship between the first moving member and the second moving member is varied in accordance with the first function; and means being arranged between the cam member and the second moving member for converting a variation of a first positional relationship to a second positional relationship in accordance with a predetermined second function, whereby the second positional relationship is being varied in response to the second function having been varied in accordance with the first function.

DESCRIPTION OF THE EMBODIMENTS

Referring to the accompanying drawings, an embodiment of the present invention will subsequently be described.

Figure 1:
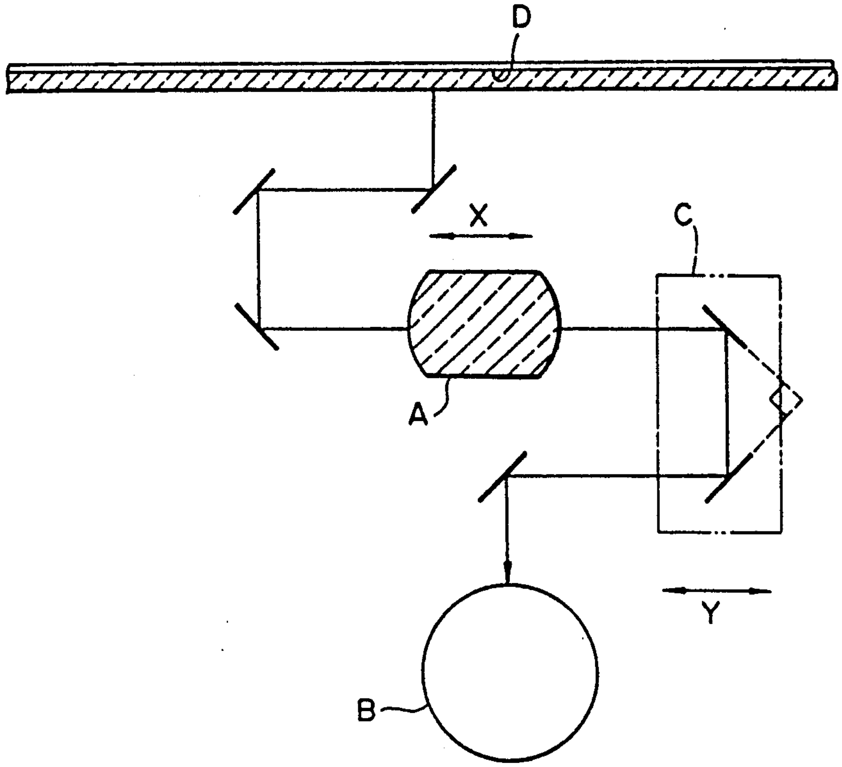
FIG. 1 is an illustrative view showing an arrangement of a variable power optical system.
Figure 2:
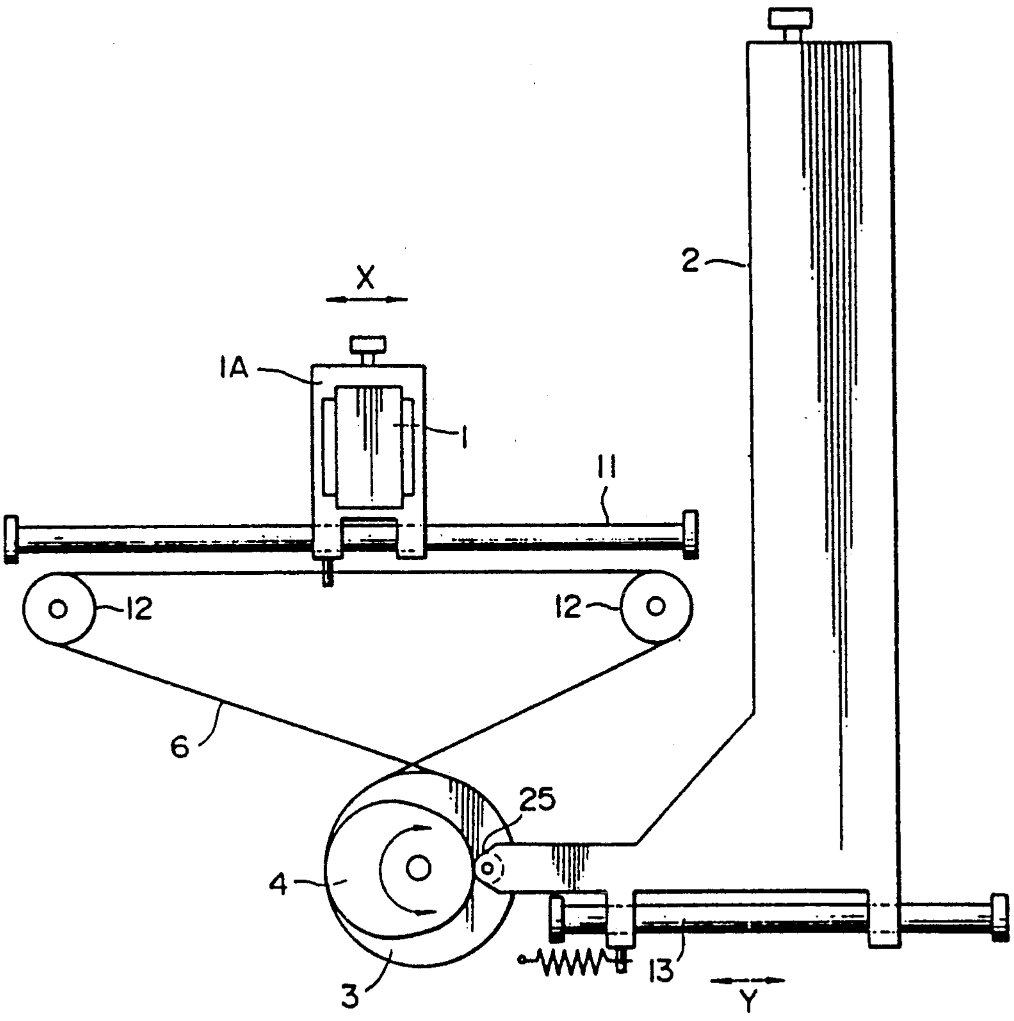
FIG. 2 (PRIOR ART)
FIG. 2 is a top view of a conventional variable power optical system.
Figure 3:
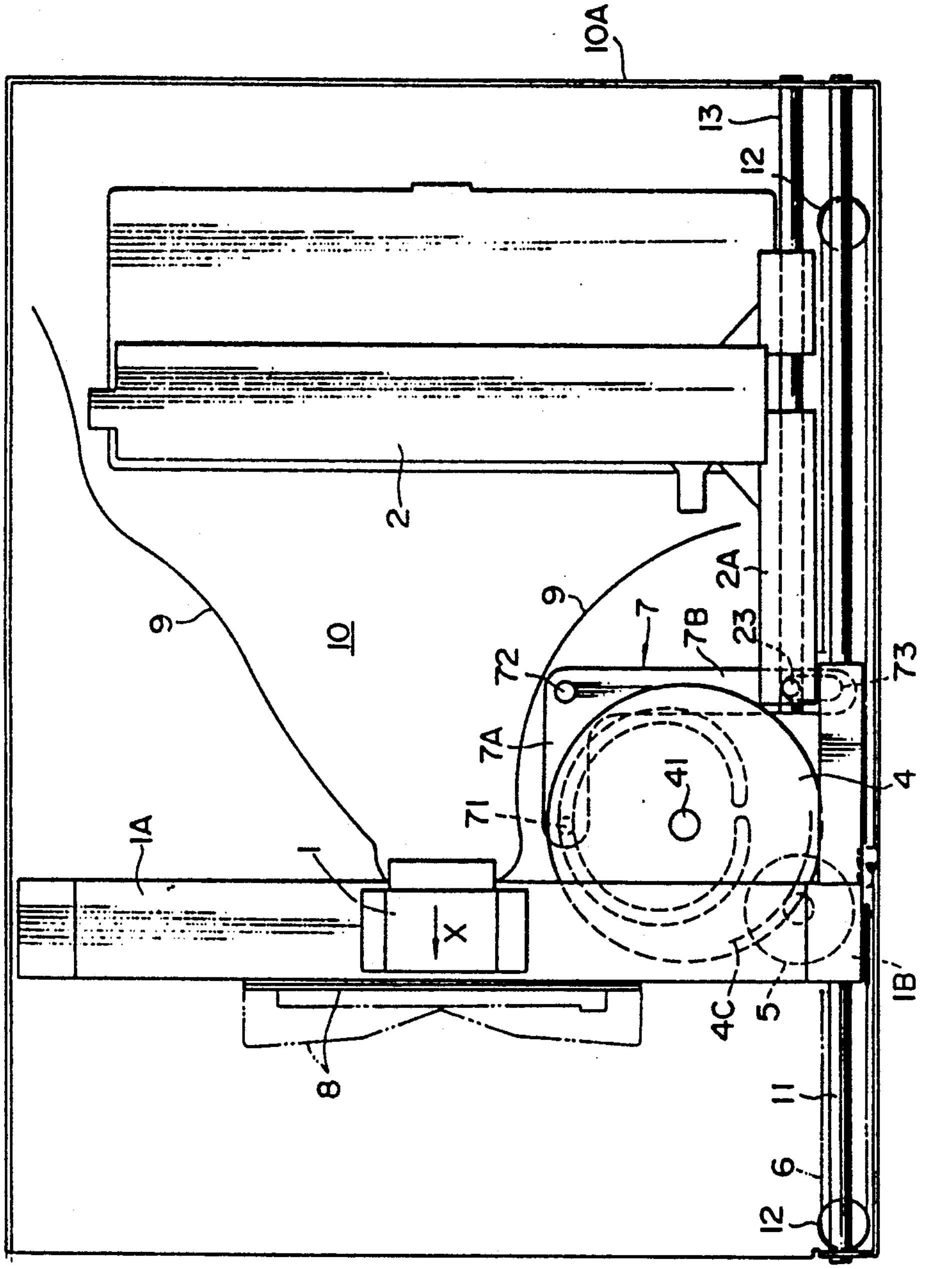
FIG. 3 is a top view of a variable power optical system as a movement controlling device according to the present invention.
Figure 4:
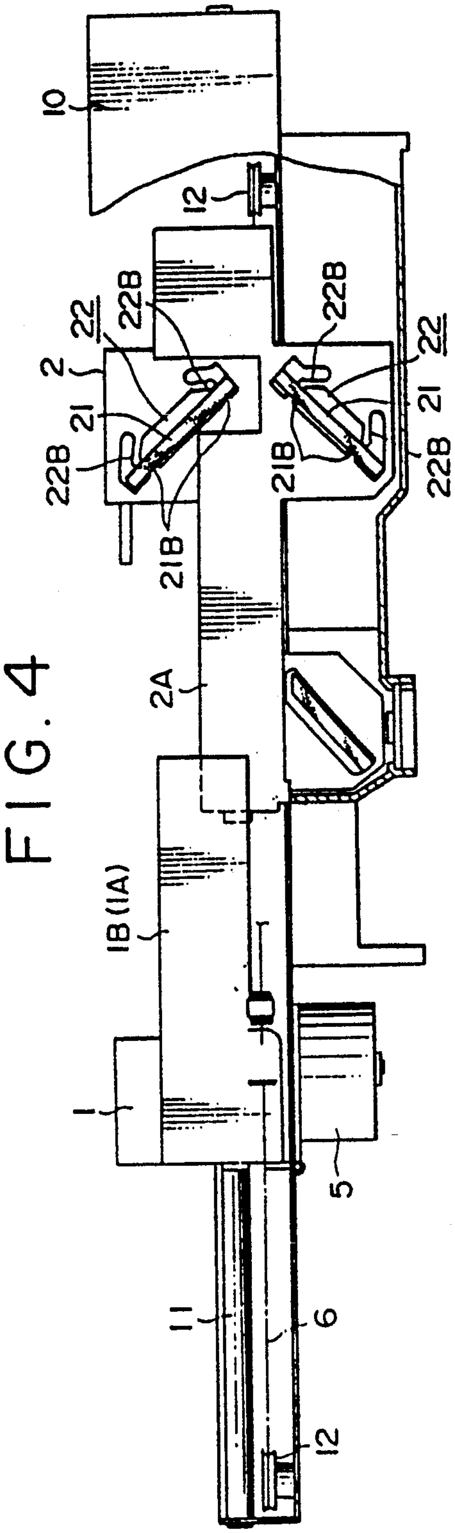
FIG. 4 is a vertical sectional view of the power optical system of FIG. 3.

FIG. 3 is a top view of a variable power optical system as a movement controlling device for use in a copying machine embodying the present invention. FIG. 4 is a vertical view of the same. The variable power of the optical system ranges from 2.05 to 0.48 times.

As shown in FIGS. 3 and 4, the variable power optical system comprises a lens 1, a mirror holder 2 holding mirrors 21 and a cam plate 4.

The lens 1 is mounted on a lens holder 1A. A bearing 1B is provided at one end of the lens holder 1A and a lens guide shaft 11 is slidably fitted into the bearing 1B, the lens guide shaft 11 being longitudinally installed in parallel to an optical axis of the lens 1. The lens holder 1A, including lens 1, is movably arranged along the lens guide shaft 11 (i.e., the optical axis of the lens 1).

Figure 5:
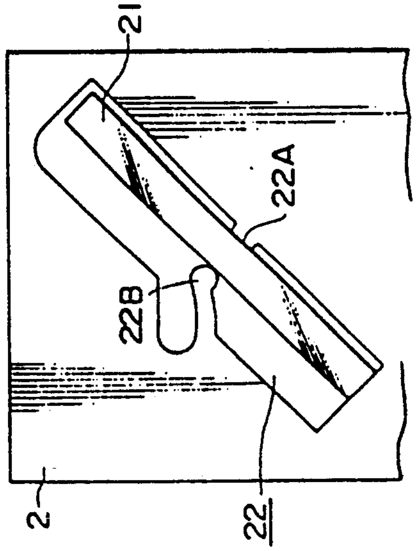
FIG. 5 is a diagram illustrating a mirror holding mechanism of the variable power optical system of FIG. 3.

As shown in FIG. 4 and FIG. 5, the mirrors 21, 21 are disposed in a predetermined relationship with each other in the mirror holder 2. As shown in FIG. 5, which is an opposite side view of the mirror holding section of mirror holder 2, opening portions 22, 22 through which the mirrors 21, 21 can respectively pass are formed in both side walls of the mirror holder 2. Protrusions 22A, 22A are formed correspondingly to each of the reflecting surfaces of mirrors 21, 21 on the periphery of the opening portions 22, 22 to support the mirror 21, 21, whereas elastically deformable projections 22B, 22B are formed correspondingly to the respective protrusions 22A, 22A integrally on the periphery thereof opposite to the respective protrusions 22A, 22A in order to hold the pressure applied thereby to the surface thereof. As shown in FIGS. 4 and 5, each mirror is stably supported by means of the protrusions 22A, 22A and the projection 22B, 22B at three support points in total; namely, at two points on one side of each mirror 21, 21 and at one point on the other.

A bearing 2A is incorporated in the mirror holder 2 and a mirror guide shaft 13 fitted to the chassis 10 in parallel to the direction of movement of the lens 1 is fitted into the bearing 2A, the mirror holder 2 being slidably movable in parallel to the direction of movement of the lens 1 along the mirror guide shaft 13.

Figure 6A:
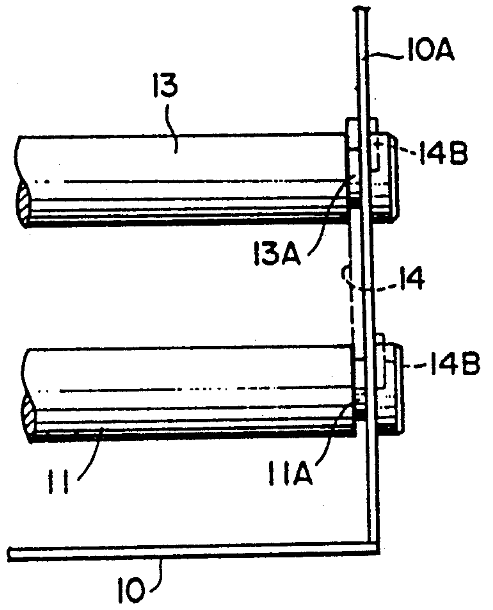
FIGS. 6(A) and 6(B) are diagrams illustrating structures for securing guide shafts along which a lens holder and a mirror holder incorporated in the variable power optical system of FIG. 3 are respectively moved.
Figure 6B:
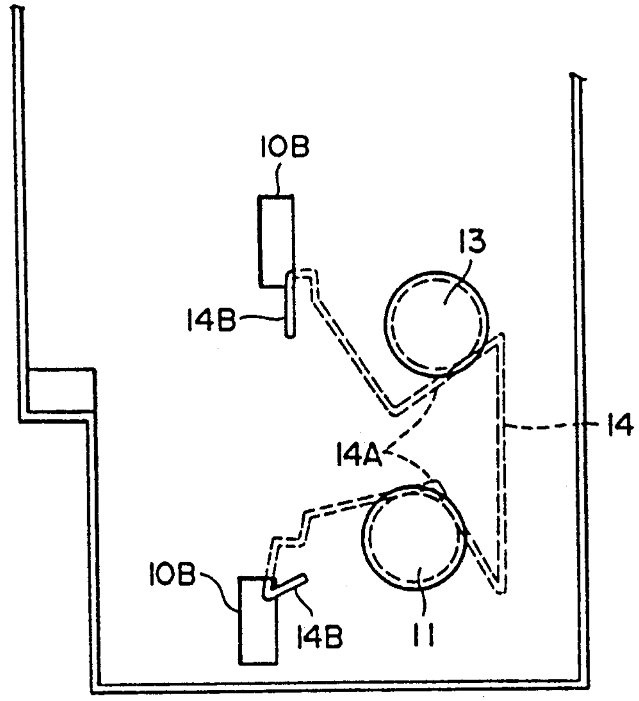

The lens guide shaft 11 and the mirror guide shaft 13 are installed parallel with each other to the chassis 10 and secured, as shown in FIG. 6(A) and (B), to an uprightly bent portion at the end of the chassis 10 with one and the same clip 14.

The clip 14 is made by bending a resilient wire, such as a piano wire, and comprises mating parts 14A, the space between which is, in their free state, wider than the space provided between the lens guide shaft 11 and the mirror guide shaft 13, and hooks 14B provided at their respective ends and used for catching hold of the chassis 10. The hooks 14B at both ends of the clip 14 are fitted into slits 10B respectively formed in the uprightly bent portion 10A of the chassis 10. The mating parts 14A are then deformed to utilize their resilient reset force for making both guide shafts 11, 13 fit into their respective mating grooves 11A, 13A. Both guide shafts 11, 13 are thus fixed. In this case, the mating parts 14A of the clip 14 are not parallel to each other and are so directed as to widen opposite to the hooks 14B. While the mating parts 14A remain mated with both guide shafts 11 and 13, their resilient reset force ensures that both guide shafts stick to the uprightly bent portion 10A.

Figure 7:
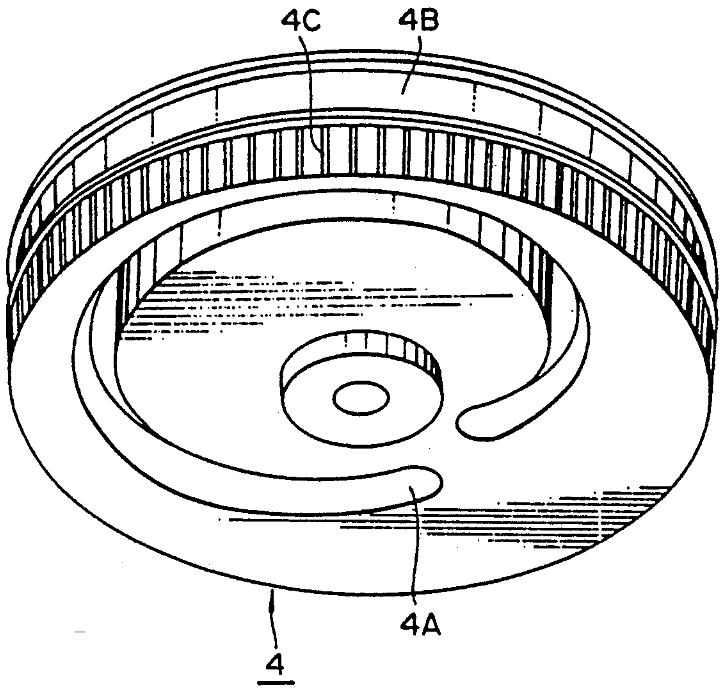
FIG. 7 is a perspective view showing a cam plate provided on the variable power optical system of FIG. 3.

As shown in a perspective view of FIG. 7, the cam plate 4 is discoidal and has a cam groove 4A formed in its undersurface to a predetermined shape. Moreover, a pulley portion 4B and an outer peripheral gear portion 4C are formed on the outer periphery of the cam plate 4. In other words, the cam groove 4A, pulley 4B and outer peripheral gear portion 4C have been integrally combined into one body.

The cam plate 4 is rotatably fitted via a shaft 41 to a predetermined position of the chassis 10, with the outer peripheral gear portion 4C meshing with a gear fixedly fitted to a spindle projected on the surface side (inside) of a flange-type pulse motor 5, anchored to the rear side of the chassis 10, so that the cam plate 4 is driven in response to the rotation of motor 5.

Pulleys 12, 12 are rotatably fitted to chassis 10 at both ends (FIG. 3) thereof along the optical axis of the lens 1 and are interlocked by means of an endless wire 6 secured to the lens holder 1A at a predetermined position. A single turn of the endless wire 6 is wound on the pulley portion 4B and driven to move therearound as the cam plate 4 rotates, so that lens holder 1A is driven to move longitudinally along the optical axis. FIG. 3 refers to a case in case the magnifying power is in an original size state. When the magnifying power is increased, the lens holder 1A, including the lens 1, is moved in the direction of arrow "X", whereas when it is reduced, the lens holder 1A, including the lens 1, is moved opposite thereto.

Cam follower 71 with one end fixed to lever 7, is slidably fitted into cam groove 4A of the cam plate 4.

Lever 7 has a short can 7A and a long arm 7B which are formed by a sheet metal processing and are L-shaped in configuration. Lever 7 is pivotally supported by a pin 72 projected from the chassis 10 at the intersection of the two arms 7A, 7B in such a manner as to be capable of rocking. The cam follower 71 is slidably fitted into cam groove 4A of cam plate 4 and is secured to the front end of the short arm 7A.

A slit 73 is bored at the front end of the long arm 7B along the longitudinal direction thereof and a shaft 23 is slidably passed through the slit 73, whereas the shaft 23 is fixedly fitted into the bearing 2A of the mirror holder 2.

When the cam follower 71 moves along the groove 4A as the cam plate 4 rotates, lever 7 rocks around the pivot point (i.e., pin 72) and drives the mirror holder 2 to move via the shaft 23 fitted into the slit 72 at the front end of the arm 7B. In other words, the mirror holder 2 is driven to move as the cam plate 4 rotates. Further, the length between the pin 72 and the shaft 23 is finely varied by the position at which shaft 23 is fixedly fitted into bearing 2A of the mirror holder 2. Therefore, the ratio of the length of the long arm 7A and the short arm 7B is finely set to the desired state.

The movement of the mirror holder 2 relative to the displacement of the cam groove 4A from a center of rotation (shaft 41) is increased in proportion to the distance between the pivot of the lever 7 and the cam follower 71 (i.e., the length of the arm 7A) and the distance between the pivot point and the shaft (i.e., the length of the arm 7B); that is, at least the displacement of the cam groove 4A may increase the movement of the mirror holder 2. The movement of the mirror holder 2 relative to the displacement of the cam groove 4*a* may be set as desired by changing the ratio of the arm 7A to 7B in length.

Figure 8:
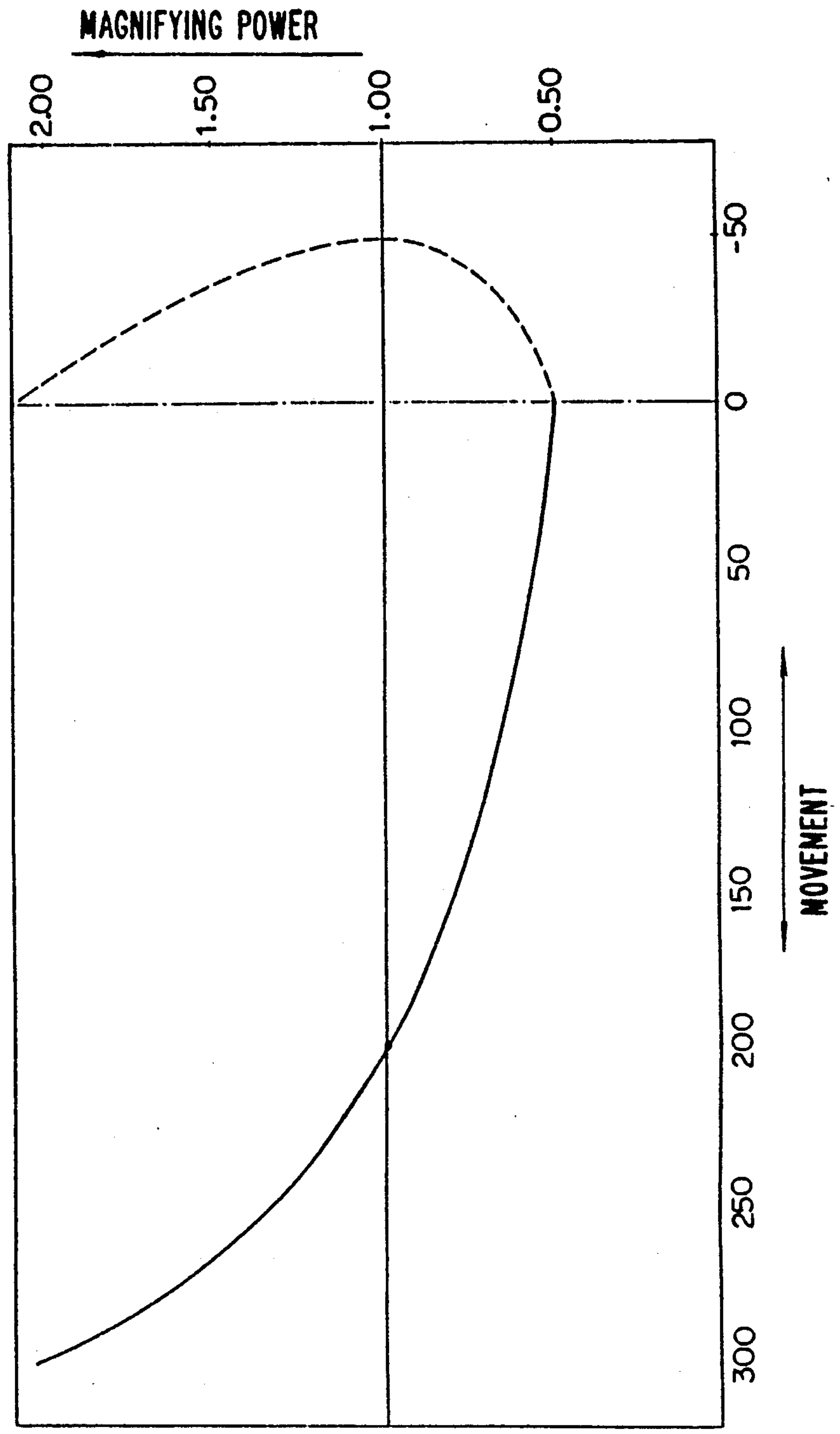
FIG. 8 is a graph showing movements of the lens holder and the mirror holder of FIG. 3 relative to a magnifying power.

The ratio of the length of the arm 7A to that of the arm 7B is set at 1:2 in this embodiment. The relation of the lens 1 to the movement of the mirror holder 2 is proportional to the magnifying power of the former, as shown in FIG. 8. A locus being generated by a movement of the cam groove 4A of the cam plate 4 is set so that the movement of the mirror holder 2 may conform to what is shown in FIG. 8 in terms of the relation between the lever 7 and the lever ratio. The mirror holder 2 is arranged so as to move away from the lens (though the percentage of movement varies) even though the magnifying power in the original size state as shown in FIG. 3, is changed toward either the magnification or reduction size state. The orginate and absicca axes in FIG. 8 represent the magnifying power and the movement, respectively, wherein a movement of the lens 1 is shown by a continuous line, whereas a movement of the mirror holder 2 including mirrors 21, 21 is shown by a broken line. These respective lines indicate movements of the lens holder 1A and the mirror holder 2, and does not indicate a positional relationship between the lens holder 1A and the mirror holder 2. In other words, on the position at which the movement is indicated as "0", both are not placed at the same position.

Figure 9A:
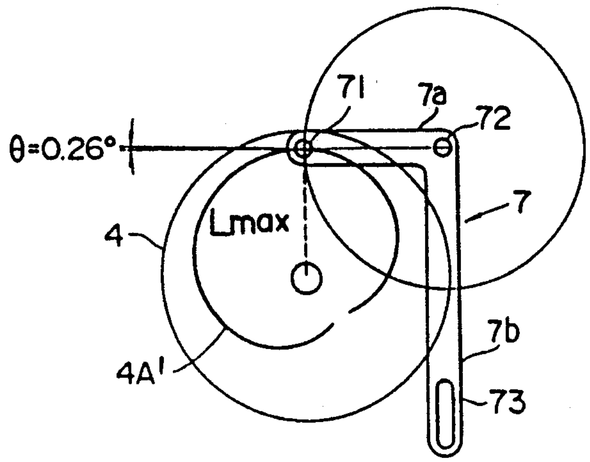
FIGS. 9(A) through 9(C) are diagrams various relationships between the cam groove configuration of the cam plate shown in FIG. 7 and rocking operations of a level connected t the cam plate in, respectively, an original size state, a magnification size state and a reduction size state.
Figure 9B:
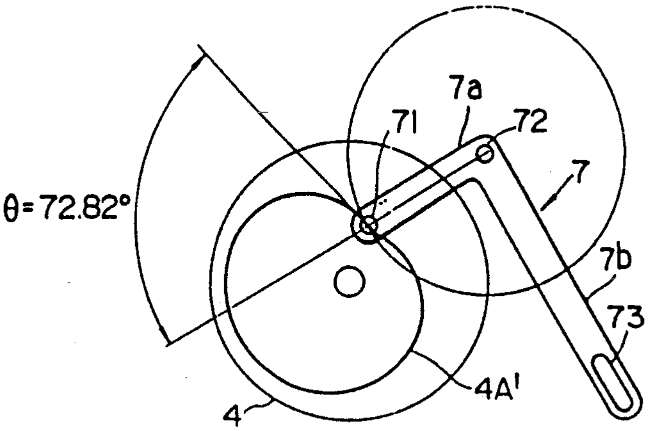
Figure 9C:
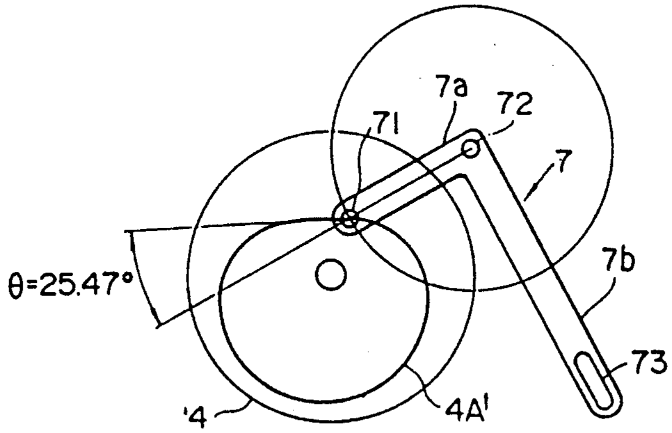

The relation of the configuration of the cam groove 4A of the cam plate 4 to the position of the pivot point of the lever 7 is such that the displacement of the cam groove 4A from the center of the rotation "1" becomes greatest, as shown in FIG. 9(A) in case the magnifying power is set to an original size setting and an angle "$\theta$", formed by an extending line of the arm 7A and a tangential line on the point at which the cam follower 71 is contacted to the cam groove 4A, becomes equal to 0.26°. The cam groove 4A is accordingly moved close to the center of rotation (the displacement from the center of rotation is reduced when the magnifying power is varied from the original size state to the magnification or reduction size state, as shown in FIGS. 9(B) or 9(C). The locus of the cam follower 71 along the cam groove 4A is shown by 4A' therein.

While the magnifying power is being changed from the original size state to the magnification size state (FIG. 9(B)), it needs exerting strength to move the mirror holder 2 because the movement of the mirror holder 2 relative to the angle "$\theta$" of rotation of the cam plate 4 consequently increases and "$\theta$" is maximized, becomes equal to 72.82°. Further, angle "$\theta$" is continuously decreased with an increasing of the length "1" and becomes, for equal example, to 25.47° as shown in FIG. 9(*c*). However, torque causing the cam plate 4 to rotate, even though the torque remains intact, results in a high driving force as the center of rotation as the cam groove 4A moves close to the center of rotation (as then radius of rotation decreases). A low-output motor 5 thus becomes usable. Due to the fact that the movement of the mirror holder 2 relative to the angle of rotation of the cam plate 4 is great, an accurate movement of the mirror holder 2 cannot be attained unless the cam groove 4 is accurately formed. The higher the accuracy required for the cam groove 4A, the closer the cam groove 4A moves to the center of rotation. With greater allowance for accuracy as depth in the focal point becomes greater when the magnifying power approaches the magnification state in the case of the optical system according to the present invention, it has been arranged that extreme accuracy is not particularly required.

Although an accurate cam groove is required in the direction in which the magnifying power is reduced (i.e., on the reduction state: FIG. 9(C)), since the depth of the focal point becomes shallow, the movement of the mirror holder 2 relative to the angle of rotation of the cam plate 4 is small (the angle of contact of the cam follower 71 relative to the cam groove 4A: $\theta$ is small) and therefore the allowance for the accuracy of the cam groove 4A is widened, whereby both offsets to the extent that extreme accuracy is particularly not necessary.

In other words, the cam groove 4A only requires accuracy in both directions of magnification/contraction with the original size state held therebetween. Moreover, the mirror holder 2 can be driven more powerfully in the direction in which power is required to move it.

Figure 10:
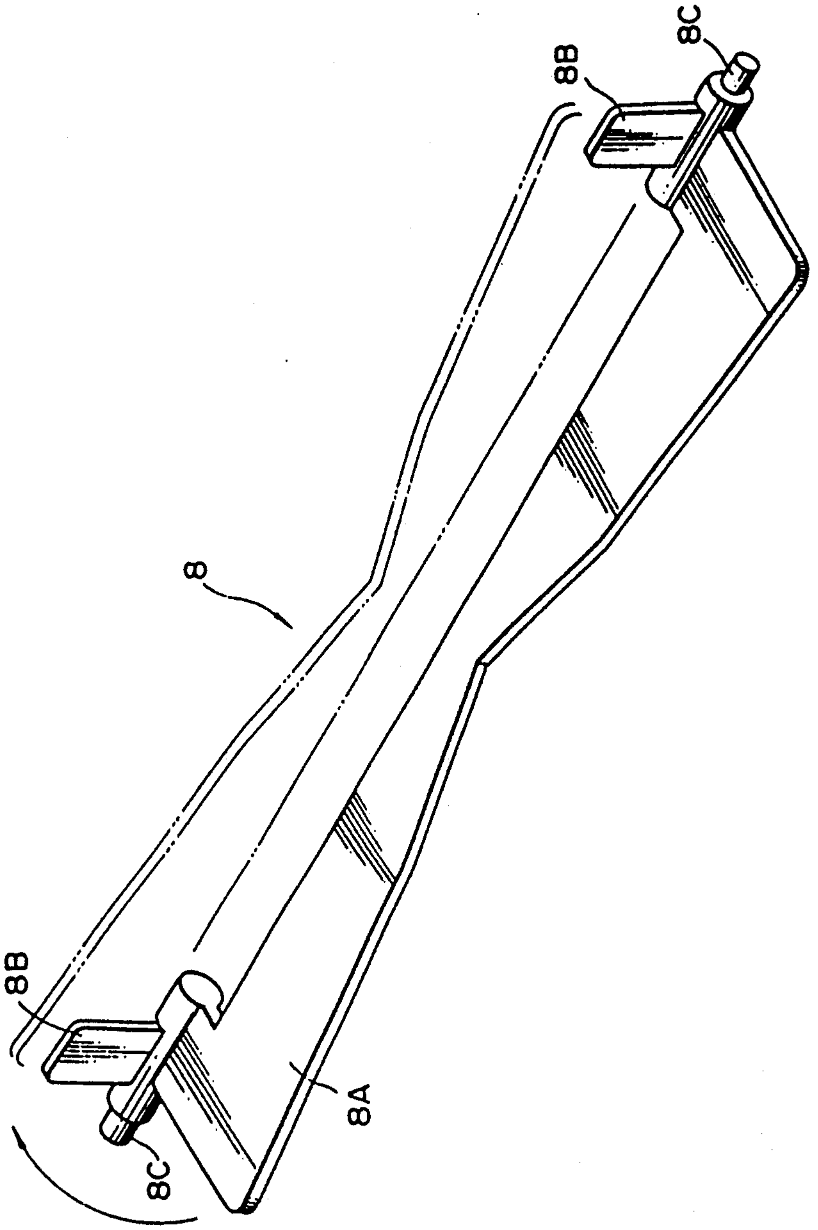
FIG. 10 is a perspective view showing a shading correction plate used in the variable power optical system of FIG. 3.

There is also shown a shading correction plate 8 in FIG. 3, which comprises, as shown in FIG. 10, a plate-like shading part 8A located in an optical path with a predetermined configuration, and having tongue-like operating parts 8B formed perpendicularly to both lower end portions of the shading part 8A respectively and shafts 8C, each being protruded sideward from the intersection of the shading part 8A and the operating part 8B and rotatably fitted into the chassis 10. The shading correction plate 8 is designed to correct characteristics peculiar to the lens 1 in that the quantity of peripheral light of the lens 1 increases, when the magnifying power is less than the original size. When the lens 1 (i.e., lens holder 1A) moves from the original size state to the reduction size state, operating parts 8B are pressed by the lens holder 1A and rotated, whereby the shading parts 8A turn upright to control the quantity of light by being located in the optical path with the predetermined configuration. In a case where no correction is needed, since the magnifying power is greater than to original size state the shading part 8A is pressed by the moving lens holder 1A and brought down. A predetermined length of a screening film 9 for preventing leakage of light is fitted to the edge face of the lens holder 1A facing the mirror holder 2 and moved as the lens holder 1A moves. The screening film 9 is located above the shading part 8A while it is laid down in order to prevent the shading correction plate 8 from malfunctioning (i.e., rotation in error).

Figure 11:
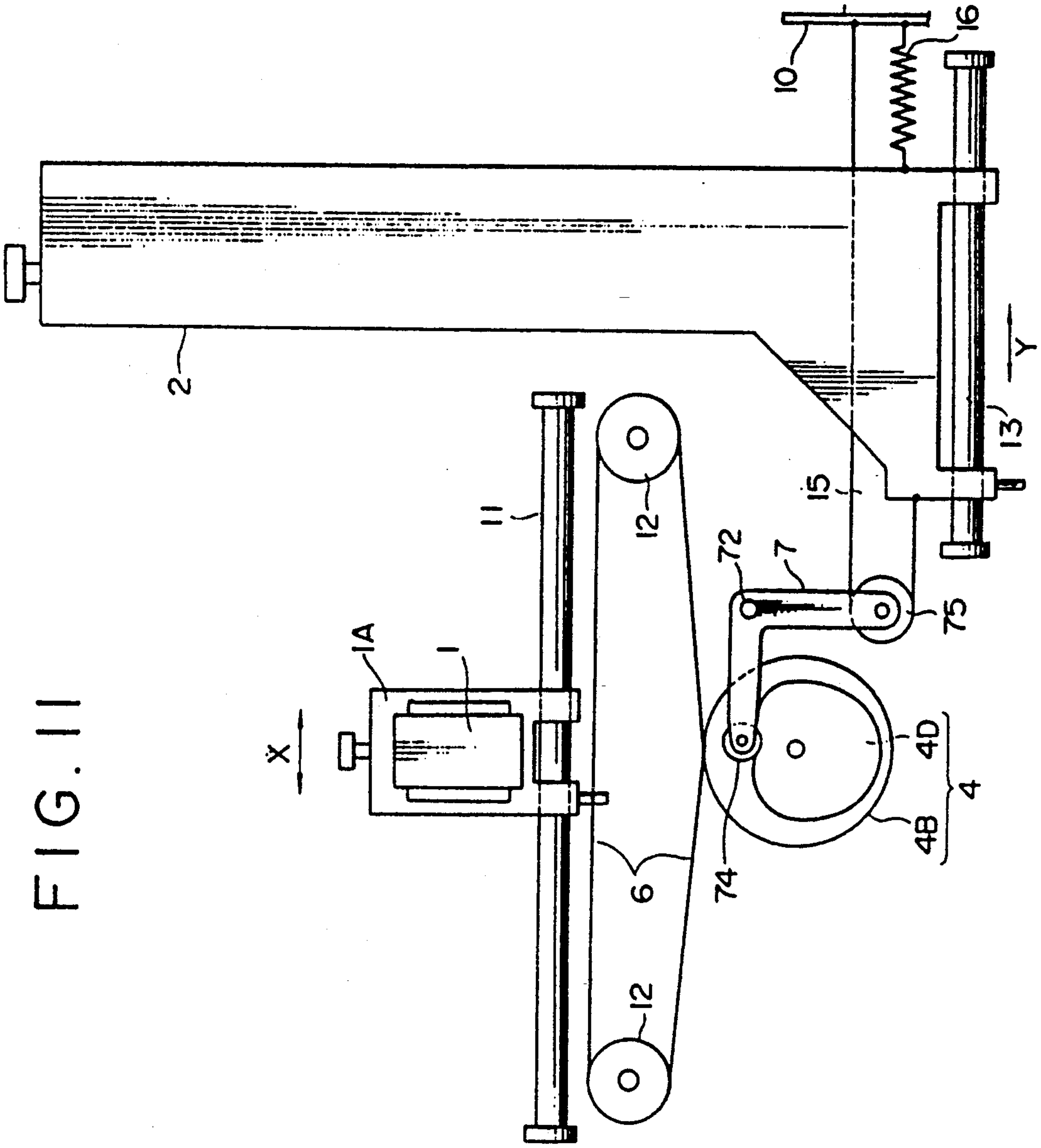
FIG. 11 is another top view of a variable power optical system as a movement controlling device according to the invention.

A second embodiment of the present invention, shown in FIG. 11, will subsequently be described.

An outer peripheral cam 4D, in place of the cam groove 4A, is formed on the cam plate 4.

The lever ratio of lever 7 is set at "1", the lever 7 being provided with a rotatable cam follower 74 at one end and a pulley 75 as a free pulley at the other. A wire or flexible member 15, with one end secured to the chassis 10, is wound on the pulley 75 and inverted so that the other end thereof is secured to the mirror holder 2.

Moreover, the mirror holder 2 is biased by a tension spring 16 with one end secured to chassis 10 and kept drawn in the direction opposite to the position where the cam plate 4 and the lever 7 are installed.

With the above arrangement, lever 7 is pulled by the tension spring 16 via the mirror holder 2, the wire 15 and the pulley 75 and the cam follower 74 is accordingly caused to abut against the cam face of the outer peripheral cam 4D.

As the cam plate 4 rotates, lever 7 rocks in proportion to the displacement of the cam face of the outer peripheral cam 4D and pulley 75 moves as lever 7 rocks. When pulley 75 moves, the mirror holder 2, to which one end of the wire 15 is secured, also moves and the movement of the mirror holder 2 at this time becomes substantially twice as great as the movement of the pulley 75. (Assuming the direction in which the wire 15 is secured is parallel to the direction in which the mirror holder 2 moves and the pulley 75 moves in the same direction, the movement of the mirror holder 2 becomes exactly twice as great as the movement of the pulley 75).

It is therefore possible to move the mirror holder 2 substantially twice as great as the displacement of the cam face of the outer peripheral cam 4D.

With this arrangement, provided the lever ratio of the layer is varied, the movement of the mirror holder 2 relative to the displacement of the cam face of the outer pripheral cam 4D can properly be varied. In addition, the movement of the mirror holder can be set by setting the displacement of the cam face of the outer peripheral cam 4D as desired.

The member on which the pulley 74 and the cam follower 74 are disposed and moved need not necessarily be the lever capable of rocking but may be such a member as is capable of linearly moving in the direction in parallel to a direction in which the mirror holder 2 is moved.

What is claimed is:

1. A movement controlling device for controlling a movement of a first moving member that is movable along a predetermined direction and a movement of a second moving member that is movable along another predetermined direction, said movement controlling device comprising:

means for driving said first moving member so as to move said first moving member along said predetermined direction;

a cam member comprising a cam portion, a gear portion, and a pulley coaxially arranged for rotation in response to a driving operation executed by said driving means, said cam portion comprising means for driving said second moving member so as to move in accordance with a first function based upon a cam groove formed on said cam portion, whereby a distance between said first moving member and said second moving member is varied in accordance with said first function;

said gear member comprising means for transmitting drive from said drive means to said cam member, said pulley comprising means for transmitting drive to said first moving member; and means for converting a variation of said distance to another variation in accordance with a second function, said converting means being arranged between said cam member and said second moving member, wherein said distances varied in response to said second function having been varied in accordance with said first function, said cam groove being shaped so as to vary a contact angle between said converting means and a tangential line at a point at which said converting means contacts said cam portion as said first moving member is driven.

2. The movement controlling device according to claim 1, wherein said drive means comprises a motor member for generating a drive force and a pair of pulley members which are arranged along said predetermined direction, an endless belt being connected to said first moving member, and wherein said pulley includes a portion around which said endless belt is wound.

3. The movement controlling device according to claim 2, wherein said converting means comprises a lever member having two arm portions that are adapted to be substantially perpendicular to each other and pivotally supported by a shaft member, one of said arm portions being connected to a cam follower portion that is movable along said cam groove formed on said cam member, the other of said arm portions being connected to said second moving member.

4. The movement controlling device according to claim 3, wherein a length of one of said arm portions that is connected to said cam follower member is shorter than that of said other arm portions that is connected to said second moving means, whereby a displacement of said second moving member is magnified in accordance with a ratio of length of said arm portions.

5. The movement controlling device according to claim 3, wherein said convert means comprises a pulley member connected to said cam follower member and a lever member composed of two arm portions of which length are equal to each other and adapted to be perpendicular to each other.

6. The movement controlling device according to claim 2, wherein said predetermined directions of said first and second moving members are parallel with each other, and wherein said first moving member comprises a lens holder supporting a predetermined focal length lens and said second moving member comprises a mirror holder supporting a plurality of mirrors.

7. The movement controlling device according to claim 4, wherein said second function is composed in such a fashion that a length between a rotating center of said cam member and said cam follower member is minimized in case that an angle formed by an extending line of one of said arm members and a tangential line on a point at which said cam follower member is contacted to said cam portion is maximized.

8. The movement controlling device according to claim 7, wherein said second function is further composed in such a fashion that said angle is continuously decreased with an increasing of said length between a rotating center of said cam member and said cam follower member.

9. The movement controlling device according to claim 3, which further comprises adjust means for moving a position at which the other of said arm members is connected to said second moving member along a direction in parallel to the other of said arm members.

10. A movement controlling device for controlling a movement of a first moving member that is movable along a first predetermined direction and a movement of a second moving member that is movable along a second predetermined direction, said movement controlling device comprising:

means for driving said first moving member along said first predetermined direction;

means for transmitting a driving force of said drive means to said second moving member;

a cam member including a cam portion, a gear portion, and a pulley coaxially arranged for rotation about a single point, said cam member being rotatable in response to operation of said drive means, said gear portion being coupled to said means for driving, said pulley being coupled to said first moving member, and said cam portion being coupled to said means for transmitting; and means for controlling said second moving member so that said second moving member moves along said second predetermined direction in accordance with said driving force transmitted to said transmitting means and a moving operation of said first moving member executed by said drive means, said controlling means being arranged between said transmitting means and said second moving member, said controlling means comprising a lever having two arms that are fixedly positioned to be substantially perpendicular to each other, said transmitting means being shaped so as to vary a contact angle between said controlling means and a tangential line at a point at which said controlling means contacts said transmitting means as said first moving member is driven.

11. A variable power optical system for controlling a movement of a lens holder supporting a predetermined focal lens that is movable along a first predetermined direction and a movement of a mirror holder supporting a plurality of mirrors that is movable along a second predetermined direction and parallel to said first predetermined direction, said variable power optical system comprising:

means for driving said lens holder along said first predetermined direction;

a cam member comprising a cam portion, a gear portion and a pulley coaxially arranged for rotation in response to a driving operation executed by said drive means, said cam portion comprising means for driving said mirror holder so as to move in accordance with a first function based upon a cam groove formed on said cam portion, whereby a distance between said lens holder and said mirror holder is varied in accordance with said first function; and means for converting a variation of said distance to another variation in accordance with a second function, said converting means being arranged between said cam member and said mirror holder, said cam groove being shaped so as to vary a contact angle between said converting means and a tangential line at a point at which said mirror holder contacts said cam groove as said lens holder is driven.

12. The variable power optical system according to claim 11, wherein said drive means comprises a motor member for generating a drive force and a pair of pulley members which are arranged along said predetermined direction, an endless belt being connected to said lens holder, and wherein said pulley includes a portion around which said endless belt is wound.

13. The variable power optical system according to claim 12, wherein said converting means comprises a lever member comprising two arm portions that are adapted to be perpendicular to each other and pivotally supported by a shaft member, one of said arm portions being connected to a cam follower member that is movable along said cam groove formed in said cam portion, the other of said arm portions being connected to said mirror holder.

14. The variable power optical system according to claim 13, wherein a length of one of said arm portions that is connected to said cam follower member is shorter than that of said other of said arm portions that is connected to said mirror holder, whereby a displacement of said second moving member is magnified in accordance with a ratio of length of said arm portions.

15. The variable power optical system according to claim 13, wherein said converting means comprises a pulley member connected to said cam follower member and a lever member composed of two arm portions of which length are equal to each other and adapted to be perpendicular to each other.

16. The variable power optical system according to claim 14, wherein said second function is composed in such a fashion that a length between a rotating center of said cam member and said cam follower member is minimized in case that an angle formed by an extending lie of one of said arm members and a tangential line on a point at which said cam follower is contacted to said cam portion is maximized.

17. The variable power optical system according to claim 14, wherein a modifying power corresponds to an original size value in case that a length between a rotating center of said cam member and said cam follower member is maximized.

18. The variable power optical system according to claim 6 wherein said second function is further composed in such a fashion that said angle is continuously decreased with an increasing of said length between a rotating center of said cam member and said cam follower member.

19. The variable power optical system according to claim 13, which further comprises adjust means for moving a position at which the other of said arm members is connected to said mirror holder along a direction which is parallel to the other of said arm members.

20. The variable power optical system according to claim 11, which further comprises a light shielding member provided with said lens holder and which is operated only in case that said lens holder and said mirror holder are arranged in a predetermined positional relationship.

21. A movement controlling device, comprising:

means for driving a first moving member in a first predetermined direction;

a cam member comprising a cam portion, a gear portion, and a pulley coaxially arranged for rotation in response to a driving operation executed by said drive means, said cam portion comprising means for driving the second moving member in a second predetermined direction in accordance with a first function, based on a cam groove formed on said cam portion, so that a distance between said first moving member and said second moving member is varied in accordance with said first function; and means for converting a variation of said distance to another variation in accordance with a second function, said converting means being arranged between said cam member and said second moving member, said converting means comprising a lever member having first and second arm portions that are adapted to be fixably positioned substantially perpendicular to each other, said lever member being pivotally supported by a shaft member, one of said arms being connected to a cam follower member that is movable along said cam groove formed on said cam portion, the other of said arm portions being connected to said second moving member, whereby said another variation is varied in response to said second function having been varied in accordance with said first function, said cam groove being shaped so as to vary a contact angle between said first arm portion of said lever and a tangential line at a point at which said cam follower contacts said cam groove as said first moving member is driven.

22. The movement controlling device of claim 21, wherein said driving means comprises a motor member for generating a drive force and a pair of pulley members that are arranged along said predetermined direction, an endless belt being connected to said first moving member, said pulley including a portion around which said endless belt is wound.

23. The movement controlling device of claim 21, wherein a length of one arm member is shorter than a length of the other arm member.

24. The movement controlling device of claim 21, wherein said first moving member comprises a lens holder supporting a predetermined focal length lens, and said second moving member comprises a mirror holder supporting a plurality of mirrors.

25. A movement controlling device, comprising:

means for driving a first member in a first predetermined direction;

a cam member comprising a cam portion, a gear portion and a pulley, coaxially arranged for rotation in response to a driving operation executed by said drive means, said cam portion comprising means for driving a second moving member in a second predetermined direction in accordance with a first function, based upon a profile of a cam groove associated with said cam portion, so that a distance between said first moving member and said second moving member is varied in accordance with said first function, said gear member comprising means for transmitting drive from said drive means to said cam member, said pulley comprising means for transmitting drive to said first moving member; and means for converting a variation of said distance to another variation in accordance with a second function, said converting means being arranged between said cam member and said second moving member, said converting means comprising a lever member having first and second arm portions that are adapted to be fixably positioned substantially perpendicular to each other, said lever member being pivotally supported by a shaft member, one of said arm portions being connected to a cam follower member that is movable along said cam portion, the other of said arm portions being connected to said second moving member, whereby said another variation is varied in response to said second function having been varied in accordance with said first function, said cam groove being shaped so as to vary a contact angle between said first arm portion of said lever and a tangential line at a point at which said cam follower contacts said cam groove as said first moving member is driven.

26. The movement controlling device of claim 25, wherein said first moving member comprises a lens holder supporting a predetermined focal length lens, and said second moving member comprises a mirror holder supporting a plurality of mirrors.

27. The movement controlling device of claim 4, wherein said length of said arm portions is arranged to have a ratio of substantially 1:2.

28. The variable power optical system of claim 14, wherein said length of said arm portions is arranged to have a ratio of substantially 1:2.

29. The variable power optical system of claim 14, wherein an interval between a rotating center of said cam member and said cam follower member is arranged to be maximized when a magnifying power designated by said predetermined focal length lens becomes equimultiple, an amount of movement of said mirror holder relative to an amount of rotation of said cam member being maximized when said magnifying power is varied from said equimultiple state.

30. The movement controlling device of claim 21, wherein a length of one of said arm portions that is connected to said cam follower member is shorter than that of said other arm portions that is connected to said second moving member, whereby a displacement of said second moving member is magnified in accordance with a ratio of length of said arm portions.

31. The movement controlling device of claim 30, wherein said length of said arm portions is arranged to have a ratio of substantially 1:2.

32. The movement controlling device of claim 31, wherein an interval between a rotating center of said cam member and said cam follower member is arranged to be maximized when a magnifying power designated by said predetermined focal length lens becomes equimultiple, an amount of movement of said mirror holder relative to an amount of rotation of said cam pulley being maximized when said magnifying power is varied from said equimultiple state.

33. A movement controlling device for controlling the movement of a first moving member that is movable along a first predetermined direction and a movement of a second moving member that is movable along a second predetermined direction, said movement controlling device comprising:

means for driving said first moving member along said first predetermined direction;

means for transmitting a driving force of said driving means to said second moving member including a cam member comprising a cam portion, a gear portion, and a pulley portion coaxially arranged for rotation, said cam portion coupled to said second moving member, said pulley coupled to said first moving member and said gear portion comprising means for driving said cam member; and means for controlling said second moving member so that said second moving member moves along said second predetermined direction in accordance with said driving force transmitted through said transmitting means and a moving operation of said first moving member executed by said driving means, said controlling means being arranged between said transmitting means and a second moving member, said controlling means comprising a lever having two arm members, a pulley provided on one arm member, a flexible member connected to said second moving member and engaging said pulley, said arm members positioned substantially perpendicular to each other, said transmitting means being shaped so as to vary a contact angle between said controlling means and a tangent line at a point at which said controlling means contacts said transmitting means as said first moving member is driven.

34. A movement controlling device comprising:

means for driving a first moving member in a first predetermined direction;

a cam member, comprising a cam portion, a gear portion, and a pulley coaxially arranged for rotation in response to a driving operation executed by said driving means, said cam portion comprising means for driving a second moving member in a second predetermined direction in accordance with a first function, based upon a cam groove formed on said cam portion, so that a distance between said first moving member and said second moving member is varied in accordance with said first function; and means for converting a variation of said distance to another variation in accordance with a second function, said converting means being arranged between said cam member and said second moving member, said converting means comprising a lever member having first and second arms, said first arm carrying a follower engaging said cam groove, said second arm engaging drive means for said second member, said lever member being pivotally mounted for pivoting motion about a point intermediate said arms, whereby said another variation is varied in response to said second function having been varied in accordance with said first function.

35. The movement controlling device according to claim 34, said guide means comprising a bearing member and a guide rod, said bearing member mounted to be guided for movement along said guide rod.

36. The movement controlling device according to claim 1, wherein said cam portion, said gear portion and said pulley are integral.

37. The movement controlling device according to claim 10, wherein said cam portion, said gear portion and said pulley are integral.

38. The variable power optical system according to claim 11, wherein said cam portion, said gear portion, and said pulley are integral.

39. The movement controlling device according claim 21, wherein said cam portion, said gear portion and said pulley are integral.

40. The variable power optical system of claim 11, said gear portion comprising means for transmitting drive from said drive means to said cam member and said pulley comprising means for transmitting drive to said first moving member.

41. The movement controlling device of claim 21, said gear portion comprising means for transmitting drive to said cam member and said pulley comprising means for transmitting drive from said cam member to said first moving member.

42. The movement controlling device of claim 34, said gear portion comprising means for transmitting drive from said drive means to said cam member and said pulley comprising means for transmitting drive to said first moving member.

* * * * *

UNITED STATES PATENT AND TRADEMARK OFFICE
CERTIFICATE OF CORRECTION

PATENT NO. : 5,313,250

DATED : May 17, 1994

INVENTOR(S) : M. MIURA et al.

It is certified that error appears in the above-indentified patent and that said Letters Patent is hereby corrected as shown below:

On the cover, in section [75], Inventors, line 1, change "Miura, Sakado:" to ---Miura:---.

On the cover, in section [75], Inventors, line 2, change "Omiya, both of Japan" to ---both of Saitama-ken, Japan---.

At column 8, line 22 (claim 3, line 6) change "portion" to ---members---.

At column 8, line 65 (claim 9, line 5) change "members" to ---portions---.

At column 10, line 37 (claim 18, line 2) change "6" to ---16---.

At column 11, line 38 (claim 25, line 5) change "pulley." to ---pulley,---.

At column 12, line 39 (claim 32, line 7) change "pulley" to ---portion---.

At column 10, line 28, "lie" to --line--.

Signed and Sealed this

Twelfth Day of March, 1996

Attest:

BRUCE LEHMAN

*Attesting Officer* *Commissioner of Patents and Trademarks*